US011251562B2

(12) United States Patent
Byrne et al.

(10) Patent No.: US 11,251,562 B2
(45) Date of Patent: Feb. 15, 2022

(54) ELECTRICAL POWER UNIT FOR A WORK SURFACE

(71) Applicants: Norman R. Byrne, Ada, MI (US); Daniel P. Byrne, Lowell, MI (US); Peter J. Maher, Grand Rapids, MI (US); Aaron G. Lautenbach, Rockford, MI (US); Shawn R. Gibson, Fremont, MI (US); Hansen Ma, Grand Rapids, MI (US)

(72) Inventors: Norman R. Byrne, Ada, MI (US); Daniel P. Byrne, Lowell, MI (US); Peter J. Maher, Grand Rapids, MI (US); Aaron G. Lautenbach, Rockford, MI (US); Shawn R. Gibson, Fremont, MI (US); Hansen Ma, Grand Rapids, MI (US)

( * ) Notice: Subject to any disclaimer, the term of this patent is extended or adjusted under 35 U.S.C. 154(b) by 0 days.

(21) Appl. No.: 17/085,295

(22) Filed: Oct. 30, 2020

(65) Prior Publication Data

US 2021/0135390 A1    May 6, 2021

Related U.S. Application Data

(60) Provisional application No. 62/929,297, filed on Nov. 1, 2019.

(51) Int. Cl.
*H01R 13/506*     (2006.01)
*H01R 31/02*      (2006.01)
(Continued)

(52) U.S. Cl.
CPC .......... *H01R 13/506* (2013.01); *H01R 31/02* (2013.01); *H01R 31/065* (2013.01); *H01R 12/75* (2013.01);
(Continued)

(58) Field of Classification Search
CPC .... H01R 13/506; H01R 31/02; H01R 31/065; H01R 12/75; H01R 13/582; H01R 2103/00; H01R 24/78; H02G 3/16
See application file for complete search history.

(56) References Cited

U.S. PATENT DOCUMENTS 3,005,179 A * 10/1961 Holt ................... H01R 31/02
                                                      439/652
3,315,219 A * 4/1967 Brinser .................. H01R 9/26
                                                      439/724
(Continued)

*Primary Examiner* — Tho D Ta
(74) *Attorney, Agent, or Firm* — Gardner, Linn, Burkhart & Ondersma LLP

(57) ABSTRACT

An electrical power or electronic data unit includes an outer housing and an inner housing that is insertable into the outer housing. The outer housing has an outer front face panel defining an outer receptacle opening and the inner housing has an inner rear housing portion plus an inner front face portion defining an inner receptacle opening aligned with the outer receptacle opening. A circuit board substrate is positioned inside the inner housing with an electrical contact mounted to the board substrate and aligned with and accessible through the inner and outer receptacle openings. A contact support extends rearwardly from the inner front face portion adjacent the inner receptacle opening, the contact support serving to limit movement of the electrical contact during insertion of a plug or prong into engagement with the electrical contact.

20 Claims, 6 Drawing Sheets

(51) Int. Cl.
*H01R 31/06* (2006.01)
*H01R 12/75* (2011.01)
*H01R 13/58* (2006.01)
*H01R 103/00* (2006.01)
*H01R 24/78* (2011.01)
*H02G 3/16* (2006.01)

(52) U.S. Cl.
CPC ............ *H01R 13/582* (2013.01); *H01R 24/78* (2013.01); *H01R 2103/00* (2013.01); *H02G 3/16* (2013.01)

(56) References Cited

U.S. PATENT DOCUMENTS

| | | | | |
|---|---|---|---|---|
| 3,349,363 A * | 10/1967 | Goodman | ............... | H01R 31/02 439/105 |
| 4,193,660 A * | 3/1980 | Jaconette | ............. | H01R 13/112 439/474 |
| 4,934,962 A * | 6/1990 | Luu | ........................ | H01R 31/02 439/651 |
| 5,503,565 A * | 4/1996 | McCoy | ................... | H01R 29/00 439/171 |
| 5,556,308 A | 9/1996 | Brown et al. | | |
| 6,910,913 B1 * | 6/2005 | Satern | ...................... | H01R 9/24 439/439 |
| 6,929,514 B1 * | 8/2005 | Chuang | ................... | H01R 31/02 439/108 |
| 8,444,432 B2 | 5/2013 | Byrne et al. | | |
| 8,480,429 B2 | 7/2013 | Byrne | | |
| 8,758,031 B2 | 6/2014 | Cheng et al. | | |
| 9,312,673 B2 | 4/2016 | Byrne et al. | | |
| 10,008,816 B2 | 6/2018 | Byrne et al. | | |
| 10,673,191 B2 | 6/2020 | Byrne et al. | | |
| 10,720,795 B2 | 7/2020 | Byrne et al. | | |
| 10,873,167 B2 | 12/2020 | Byrne et al. | | |
| 10,965,049 B2 | 3/2021 | Byrne et al. | | |
| 2002/0154528 A1 | 10/2002 | Ravid | | |
| 2014/0213093 A1 * | 7/2014 | Tai | ......................... | H01R 13/20 439/352 |
| 2016/0141973 A1 | 5/2016 | Abdalla et al. | | |
| 2021/0005989 A1 | 1/2021 | Byrne et al. | | |

* cited by examiner

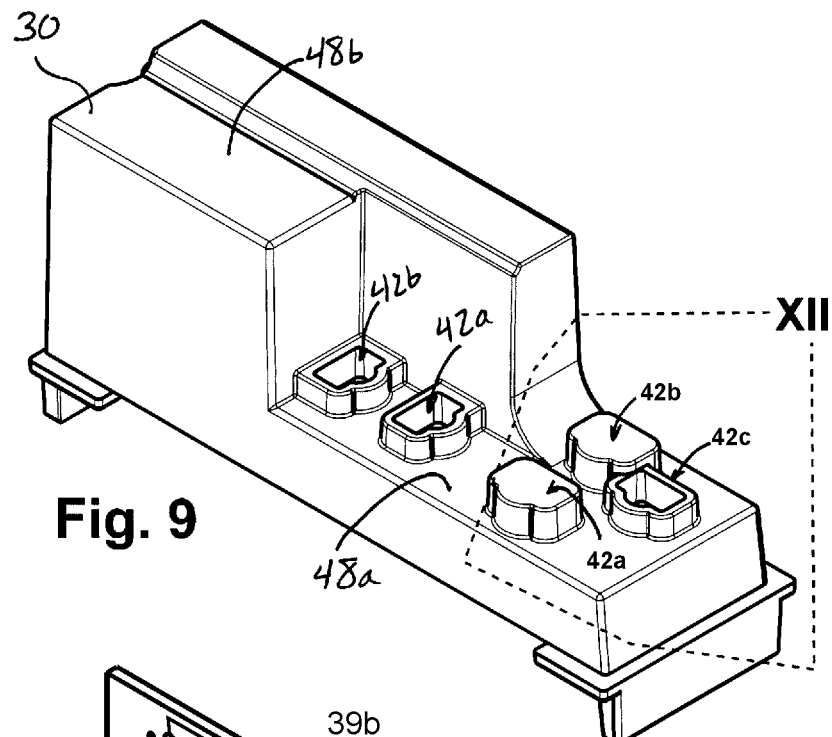
Fig. 9
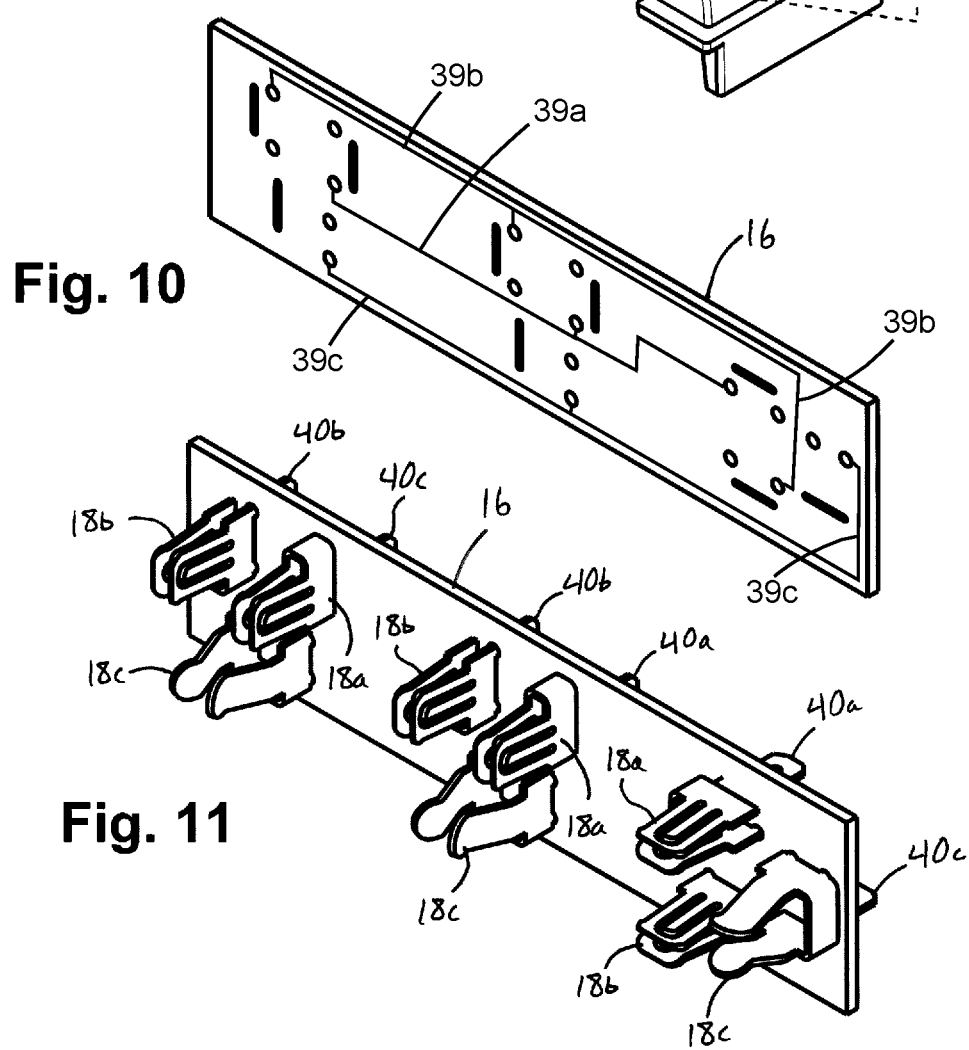
Fig. 10
Fig. 11

ELECTRICAL POWER UNIT FOR A WORK SURFACE

CROSS REFERENCE TO RELATED APPLICATION

The present application claims the benefit of U.S. provisional application Ser. No. 62/929,297, filed Nov. 1, 2019, which is hereby incorporated by reference in its entirety.

FIELD OF THE INVENTION

The present invention relates to electrical power and/or data outlet or receptacle systems for use in work areas or the like.

BACKGROUND OF THE INVENTION

Electrical charging and data outlets, cords, and plugs are in increasing demand as the number of electrical and electronic devices that use such outlets, cords, and plugs continues to increase. Some conventional outlets and receptacles may be susceptible to wear or damage, such as electrical contacts that plastically deform and no longer establish good mechanical/electrical connections with plugs or prong. This could be caused by frequent use over time, or by misaligned insertion of a plug or prong, or by excessive forces applied to an inserted plug or prong, for example.

SUMMARY OF THE INVENTION

The present invention provides an electrical power or electronic data unit that is readily assembled from components that allow for convenient adaptation to provide different types, positions, and orientations of outlet receptacles. The unit has a damage and wear-resistant design that does not have any exposed electrical conductors even if an outer housing is opened. The design reduces the need for separate mechanical fasteners, and may be designed to assemble together without any separate fasteners at all.

In one embodiment, the unit includes an outer housing and an inner housing that is insertable into the outer housing. The outer housing has an outer front face panel defining an outer receptacle opening and the inner housing has an inner rear housing portion plus an inner front face portion defining an inner receptacle opening that is aligned with the outer receptacle opening. A circuit board substrate is positioned inside the inner housing, with an electrical contact mounted to the board substrate and aligned with and accessible through both the inner and outer receptacle openings. A contact support extends rearwardly from the inner front face portion adjacent the inner receptacle opening, the contact support serving to limit movement of the electrical contact during insertion of a plug or prong into engagement with the electrical contact. The unit may include at least one low voltage DC receptacle, such as a USB-A or USB-C receptacle, and may further include a power transformer for reducing a line voltage (e.g., 110V AC or 220V AC), that supplies electrical power to standard receptacle outlets, down to a lower voltage (such as about 2V DC to about 12V DC, for example).

According to one form of the present invention, an electrical power or electronic data unit includes an outer housing with outer front face panel, an inner housing with inner rear housing portion and inner front face portion, an electrical contact inside the inner housing, and a contact support at a rear surface of the inner front face portion. The outer front face panel defines an outer receptacle opening, and the inner front face portion defines an inner receptacle opening that is aligned with the outer receptacle opening. The electrical contact is positioned inside the inner housing and is aligned with and accessible through both the outer and inner receptacle openings. The contact support extends rearwardly from the rear surface of the inner front face portion, and is located adjacent the inner receptacle opening. The contact support can limit movement of the electrical contact in the direction of the contact support during insertion of a plug or prong into engagement with the electrical contact.

In one aspect, the outer front face panel defines a plurality of outer receptacle openings in spaced arrangement, and the inner front face portion defines a plurality of inner receptacle openings aligned with respective ones of the outer receptacle openings. The electrical contact includes a plurality of electrical contacts in spaced arrangement and aligned with respective ones of the inner receptacle openings. A plurality of the contact supports are arranged with at least one of the contact supports at each of two opposite sides of the inner receptacle openings. Optionally, at least two of the electrical contacts include high voltage AC power contacts.

In another aspect, there is a circuit board substrate positioned inside the inner housing, with the electrical contact mounted to the circuit board substrate.

In yet another aspect, there are at least four electrical contacts that are high voltage AC power contacts cooperating to form a first high voltage AC receptacle including a first line contact and a first neutral contact, and a second high voltage AC receptacle including a second line contact and a second neutral contact. The first and second line contacts are in electrical communication with one another via a line conductor path formed along the circuit board substrate, and the first and second neutral contacts are in electrical communication with one another via a neutral conductor path formed along the circuit board substrate and spaced from the line conductor path.

In a further aspect, the first line contact and the first neutral contact include respective power receiving terminals protruding rearwardly from the circuit board substrate. The inner rear housing portion defines a pair of power input openings aligned with respective ones of the power receiving terminals.

In still another aspect, a line output terminal is provided for coupling to a line conductor of a power input cord, and a neutral output terminal is provided for coupling to a neutral conductor of the power input cord. The line and neutral output terminals are insertable through respective power input openings for electrical connection to respective power receiving terminals of the first line contact and the first neutral contact.

In a still further aspect, the outer housing defines a power cord opening fitted with a strain relief grommet. The power input cord can be routed into the outer housing via the power cord opening and the strain relief grommet, so that a portion of the power input cord and portions of the line and neutral output terminals are positionable between the inner rear housing portion and the outer housing.

Optionally, the electrical power or electronic data unit includes an AC-to-DC electrical power converter and a low voltage DC power receptacle that is aligned with one of the of the outer receptacle openings and one of the inner receptacle openings. At least two of the electrical contacts include high voltage AC power contacts cooperating to form a high voltage AC receptacle including a line contact and a neutral contact. The power converter receives high voltage AC electrical power from respective electrical conductors in communication with the first and second line contacts, and supplies low voltage DC electrical power to the low voltage DC power receptacle.

In another aspect, the inner rear housing portion includes a first rear wall portion spaced relatively closer to the inner front face portion at the high voltage AC power contacts, and a second rear wall portion adjacent the first rear wall portion and spaced relatively further from the inner front face portion at the AC-to-DC electrical power converter. Optionally, the first rear wall portion of the inner rear housing portion defines at least one power input opening that permits a power cord to be electrically connected to the high voltage AC power contacts.

Optionally, a continuous wall surrounds each of the inner receptacle openings and projects rearwardly from the rear surface of the inner front face portion. Optionally, the contact supports are positioned immediately outboard of the continuous walls.

In a further aspect, an upper portion of the outer housing defines an upper pair of elongate channels and a lower portion of the outer housing defines a lower pair of elongate channels spaced opposite the upper pair of elongate channels. The upper and lower pairs of elongate channels support the outer front face panel and the inner front face portion.

Optionally, the outer front face panel includes an upper projection for engaging one of the upper elongate channels, and a lower projection for engaging one of the lower elongate channels. The inner front face portion includes an upper projection for engaging another upper elongate channel and a lower projection for engaging another lower elongate channel.

In a still further aspect, a pair of end caps are secured at open opposite ends of the outer housing. Optionally, the end caps include forward snap-fit elements configured for engagement with respective snap-fit elements of the outer front face. The end caps may further include respective lateral rear projections configured for insertion into a rearward interior portion of the outer housing. The end caps are secured to the outer housing by the outer front face and engagement of the lateral rear protections by retaining elements at the outer housing.

According to another form of the present invention, an electrical power or electronic data unit includes an outer housing with outer front face panel, an inner housing with inner rear housing portion and inner front face portion, a circuit board substrate inside the inner housing, and line and neutral contacts mounted at the circuit board substrate. The outer front face panel defines outer receptacle openings, and the inner front face portion defines inner receptacle openings aligned with the outer receptacle openings. The line and neutral contacts are aligned with and accessible through the respective inner and outer receptacle openings. The first line contact and the first neutral contact include respective power receiving terminals protruding rearwardly from the circuit board substrate. The inner rear housing portion defines a pair of power input openings aligned with respective power receiving terminals. Respective line and neutral output terminals are insertable through respective ones of the power input openings for electrical connection to respective ones of the power receiving terminals.

In one aspect, there is a contact support extending rearwardly from a rear surface of the inner front face portion adjacent each of the inner receptacle openings. The contact supports limit movement of the electrical contact in the direction of the contact support during insertion of a plug or prong into engagement with respective ones of the line contact and the neutral contact.

In another aspect, there is a continuous wall surrounding each of the inner receptacle openings and projecting rearwardly from the rear surface of the inner front face portion. Optionally, the contact supports are positioned immediately outboard of the continuous walls.

Therefore, the electrical power or electronic data unit of the present invention is readily assembled with minimal tools, is resistant to damage caused by forces imparted by plug prongs or other structures inserted into outlet openings, allows for adaptability to include different types, positions, and orientations of outlet receptacles, and does not include exposed electrical conductors inside its outer housing.

These and other objects, advantages, purposes and features of the present invention will become apparent upon review of the following specification in conjunction with the drawings.

BRIEF DESCRIPTION OF THE DRAWINGS

FIG. 9 is a rear perspective view of a receptacle contact housing of the electrical power unit;

FIG. 10 is a front perspective view of a printed circuit board (PCB) substrate of the electrical power unit;

FIG. 11 is another front perspective view of the PCB substrate of FIG. 10, shown fitted with electrical power contacts.

DESCRIPTION OF THE PREFERRED EMBODIMENTS

Figure 1:
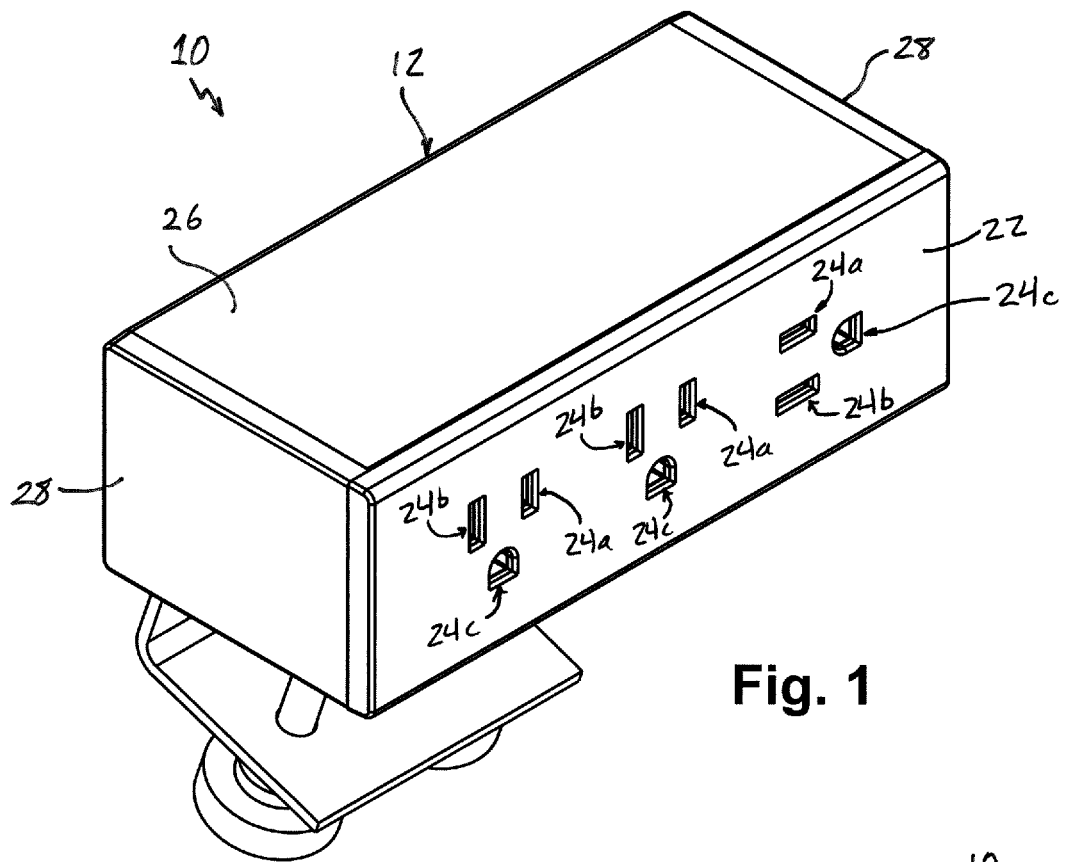
FIG. 1 is a front perspective view of an electrical power unit in accordance with the present invention, including a bracket for edge-mounting to a work surface.
Figure 2:
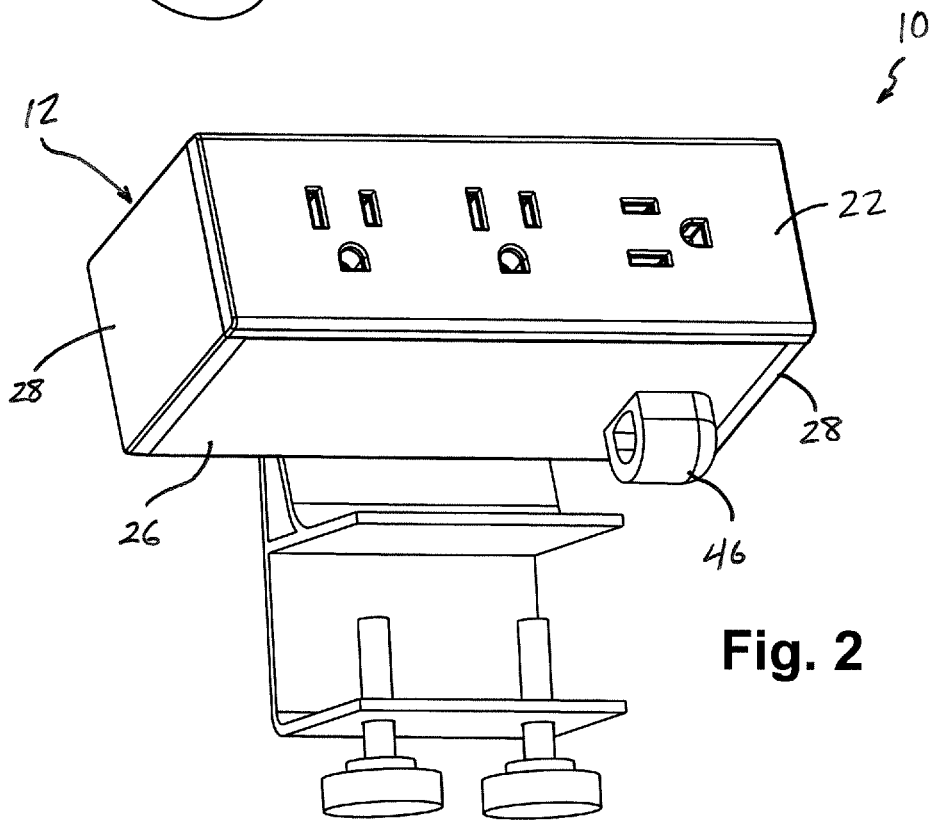
FIG. 2 is another front perspective view of the electrical power unit and bracket of FIG. 1.
Figure 3:
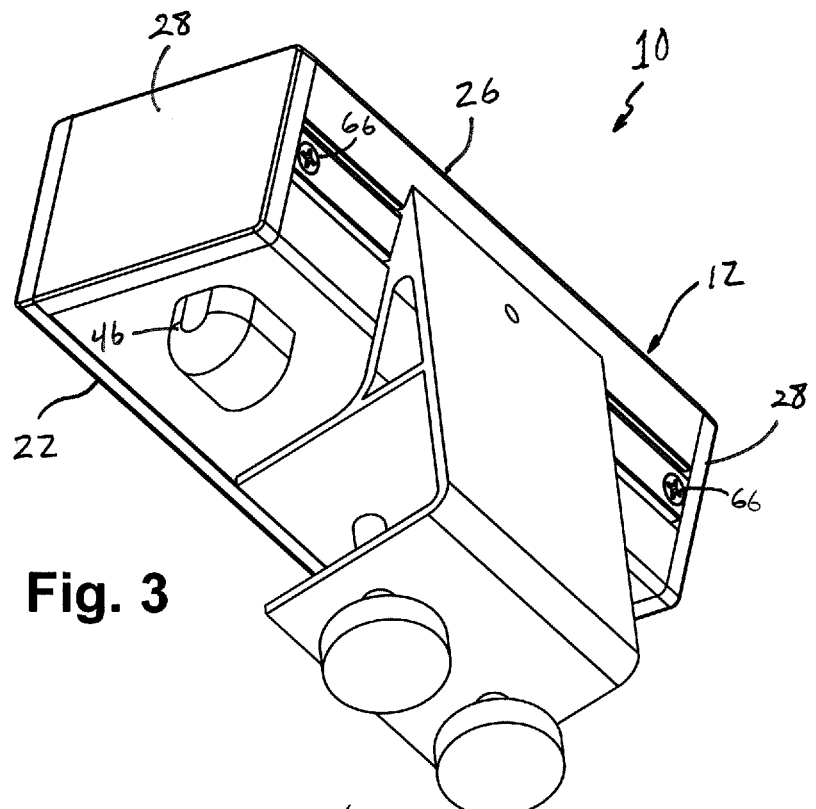
FIG. 3 is a rear perspective view of the electrical power unit and bracket.
Figure 4:
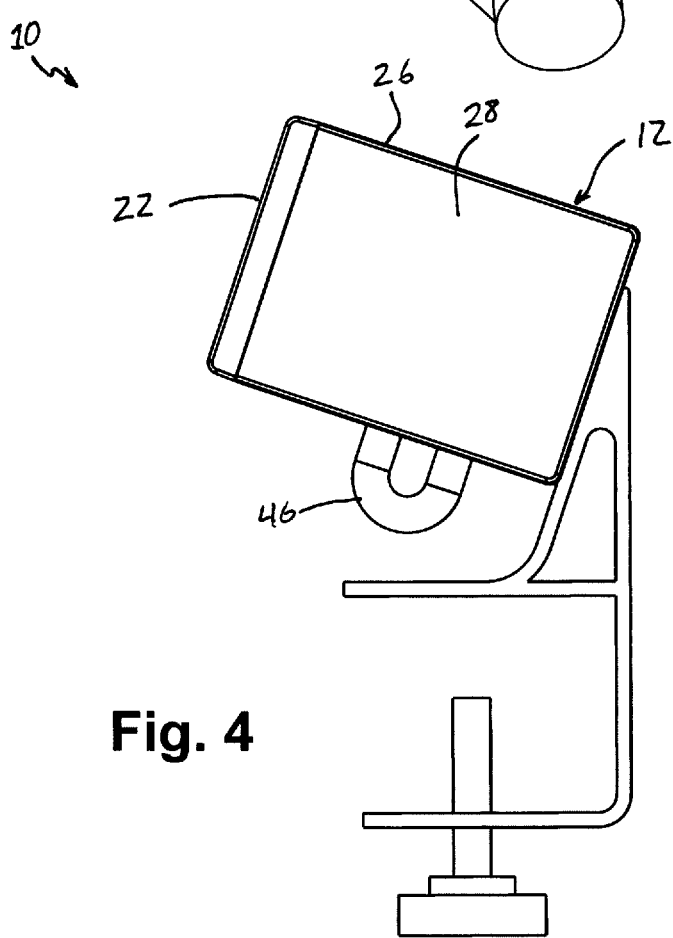
FIG. 4 is a right side elevation of the electrical power unit and bracket.
Figure 5:
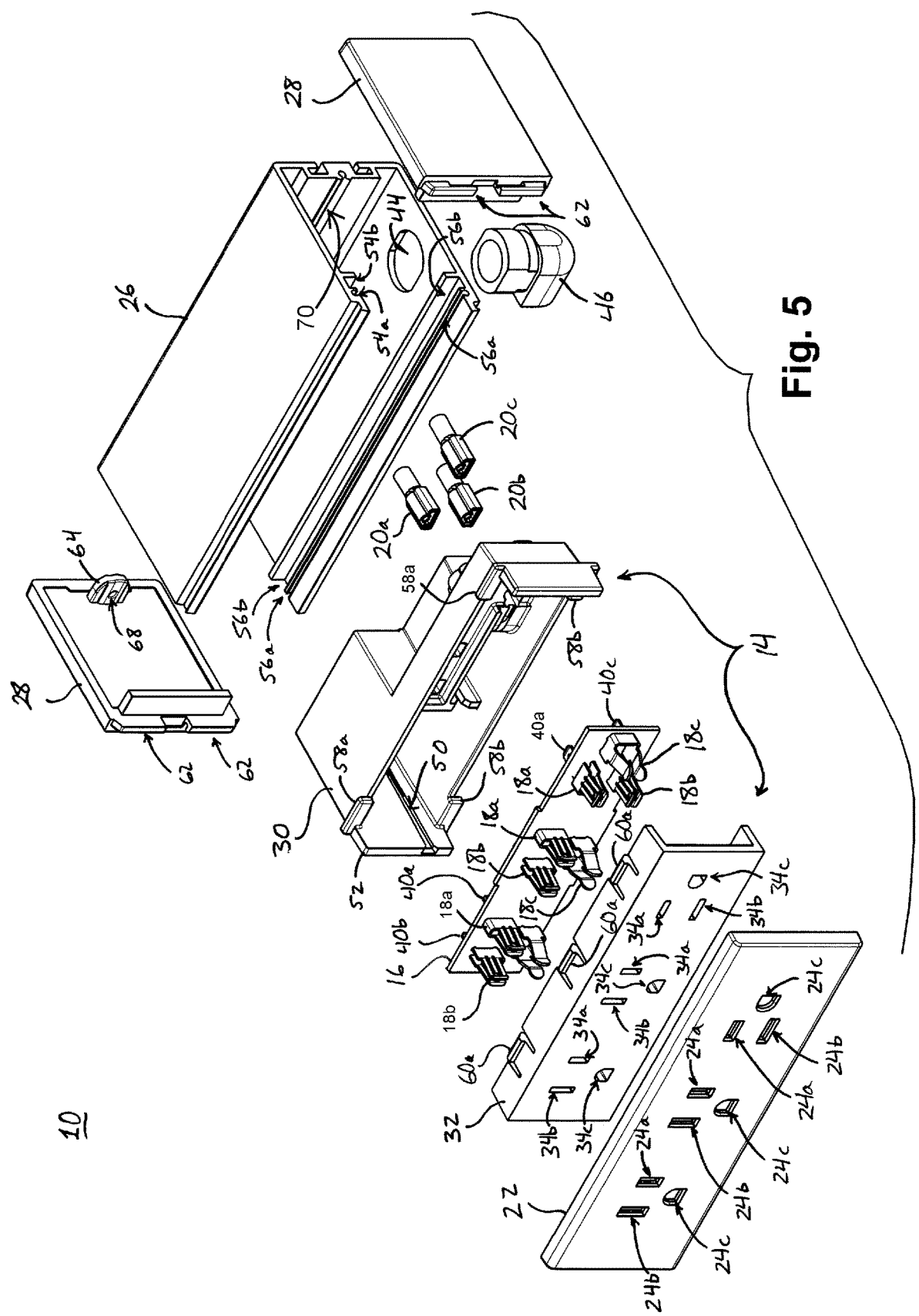
FIG. 5 is an exploded front perspective view of the electrical power unit of FIG. 1.
Figure 6:
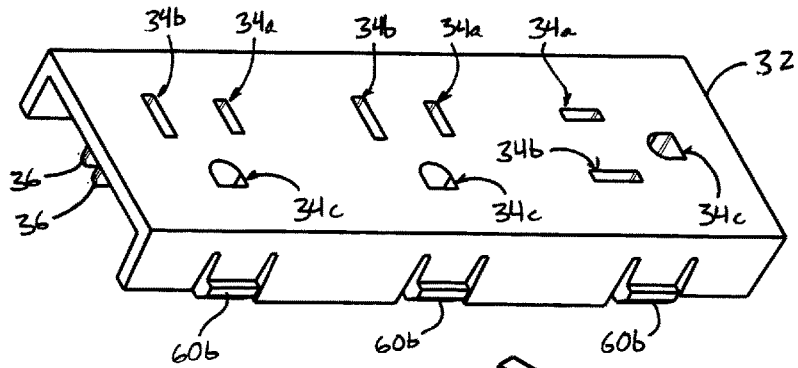
FIG. 6 is a front perspective view of a housing front cover of the electrical power unit.
Figure 12:
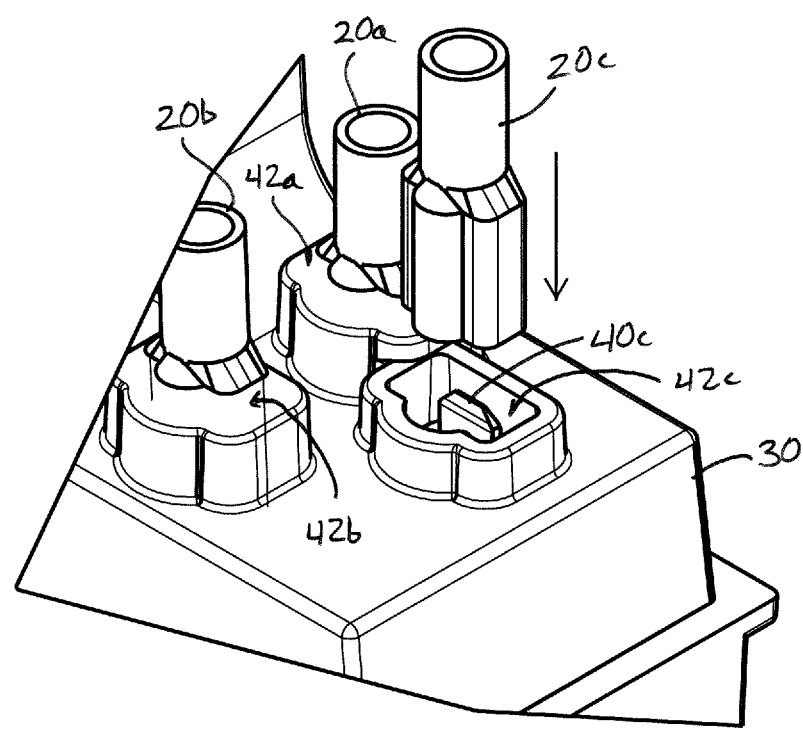
FIG. 12 is an enlarged perspective view of the region designated XII in FIG. 9.

Referring now to the drawings and the illustrative embodiments depicted therein, an electrical power or electronic data unit 10 includes an outer housing 12 that contains an inner housing 14, which in turn contains a circuit board substrate 16 supporting a plurality of electrical contacts 18a-c, such as shown in FIGS. 1-5. This arrangement allows the inner housing 14 with circuit board substrate 16 and electrical contacts 18a-c to be handled as a unit during assembly of the electrical power or electronic data unit 10, with electrical continuity from an outside power source to the electrical contacts 18a-c established via a single set of output terminals 20a-c, such as shown in FIGS. 5 and 12. Because the inner housing 14 blocks access to any live electrical contacts except through specific contact openings, the removal of any one or more portions of the outer housing 12 will not expose live high voltage electrical contacts, all of which remain within the inner housing 14.

Assembly of the unit 10 is simplified by the use of the circuit board substrate 16, which may optionally be a printed circuit board (PCB) that includes conductor traces along the board substrate to route power to multiple high voltage AC and/or low voltage DC electrical contacts therealong. Otherwise, the board substrate 16 may be simply a flat laminated composite board made of non-conductive material, in which case each electrical terminal would be electrically engaged by a respective connector. Snap-fit connections may be used used to reduce the number of separate mechanical fasteners required for assembly of the unit 10, as will be described below in more detail.

Throughout the description and claims presented herein, it will be appreciated that directional references such as "forward", "rearward", "upper", and "lower" are used merely for convenience to facilitate understanding and describe relative positioning of various components, and are not intended to be limiting as it should be appreciated that the electrical power or electronic data unit may be used in substantially any desired orientation. It should be further appreciated that electrical power contacts, receptacles, and plugs, as described herein, may be readily substituted with electronic data contacts, receptacles, and plugs, without departing from the spirit and scope of the present invention. Moreover, the term "circuit board", as used herein, should be understood to mean a board substrate made of non-conductive material, which does not necessarily have circuit conductors printed or otherwise embedded therealong, but which may simply be used to support a plurality of electrical contacts.

The outer housing 12 includes an outer front face panel 22 defining a plurality of outer receptacle openings 24a-c, and a main outer housing portion 26 which, in the illustrated embodiment, is formed as an extruded generally C-shaped channel member, such as shown in FIG. 5. Outer housing 12 further includes a pair of end caps 28 that enclose the open ends of the main outer housing portion 26. The inner housing 14 includes an inner rear housing portion 30 and an inner front face portion 32, the latter defining a plurality of inner receptacle openings 34a-c that are aligned with respective outer receptacle openings 24a-c when the inner housing 14 is inserted into the outer housing 12. The electrical contacts 18a-c, three sets of which are shown in the illustrated embodiment (each set including one line contact 18a, one neutral contact 18b, and one ground contact 18c), are aligned with corresponding ones of the outer receptacle openings and the inner receptacle openings 34a-c so that the contacts 18a-c are accessible to corresponding prongs of compatible electrical plugs (not shown). However, it will be appreciated that different arrangements of high voltage AC contacts and/or low voltage DC receptacles and/or electronic data connectors or receptacles may be accommodated without departing from the spirit and scope of the present invention.

Figure 7:
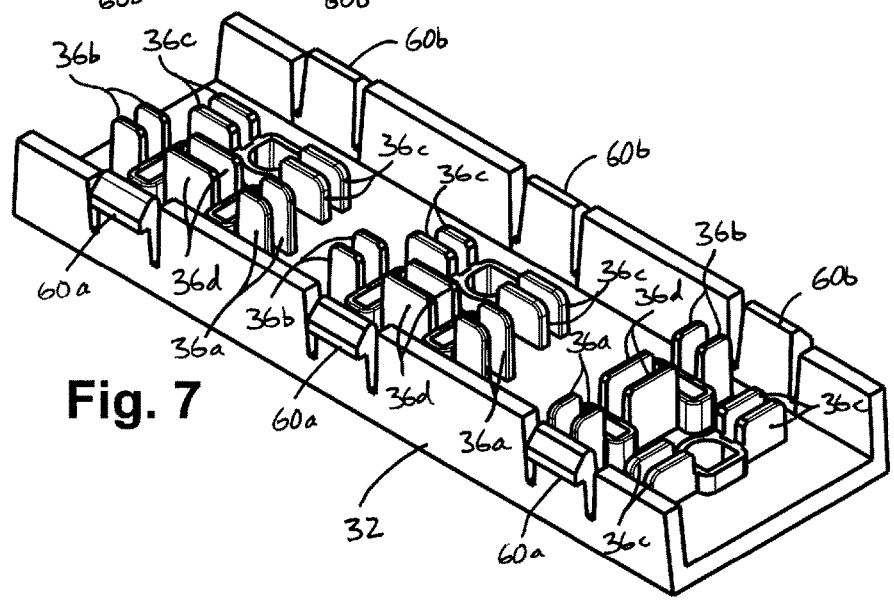
FIG. 7 is a rear perspective view of the housing front cover.
Figure 8:
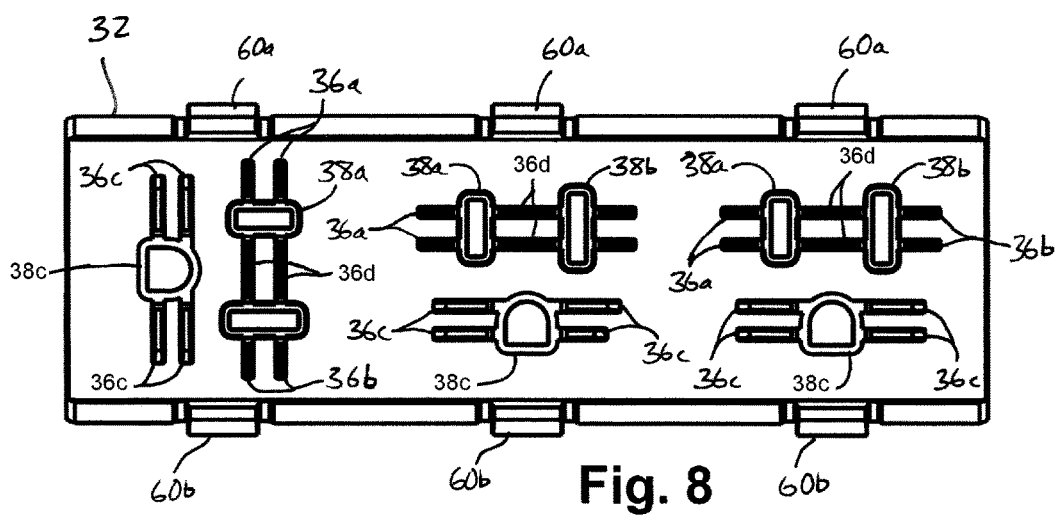
FIG. 8 is a rear elevation of the housing front cover.

Inner front face portion 32 of the inner housing 14 includes a plurality of contact supports 36a-d that project rearwardly into an interior of the inner housing 14 from a rearward surface 34a of the inner front face portion 32, such as shown in FIGS. 7 and 8. Each contact support 36a-d provides support for at least one electrical contact 18a-c by limiting the movement of the electrical contact during insertion of a plug or prong (not shown) into engagement with the electrical contact 18a-c. Contact supports 36a-d include a pair of line contact supports 36a that provide support for only a corresponding line contact 18a in an outboard direction, a pair of neutral contact supports 36b that provide support for only a corresponding neutral contact 18b in an outboard direction, a set of four ground contact supports 36c that provide support for only a corresponding ground contact 18c in both outboard directions, and a pair of neutral/line contact supports 36d that provide support for corresponding line and neutral contacts 18a, 18b in an inboard direction.

In the illustrated embodiment, and as best shown in FIG. 8, a respective continuous wall 38a-c surrounds each of the inner receptacle openings 34a-c. The continuous walls 38a-c project rearwardly from the inner front face portion 32, and serve to stiffen and strengthen the front face portion 32 in the vicinity of the inner receptacle openings 34a-c. The continuous walls 38a-c are themselves supported by the respective contact supports 36a-d, with the respective contact supports 36a-d extending further rearwardly than the continuous walls 38a-c. With this arrangement, the continuous walls 38a-c terminate in front of the forward tips or edges of the respective electrical contacts 18a-c, thus allowing the contacts 18a-c to flex during plug or prong insertion, while the contact supports 36a-d extend rearwardly beyond (behind) the forward tips or edges of the respective electrical contacts 18a-c. The contact supports 36a-d are positioned outboard of the corresponding continuous walls 38a-c and thus permit the contacts 18a-c to flex a limited distance during plug or prong insertion, or when a side load is inadvertently applied to a plug or prong that is already inserted.

The contact supports 36a-d are not necessarily contacted by the corresponding contacts when the contacts 18a-c are not engaged by a plug or prong, but upon sufficient deflection of one of the contacts 18a-c toward a respective one of the contact supports 36a-d, the electrical contact 18a-c may engage the respective contact support(s) and thus be limited or substantially prevented from making excessive further deflections that could result in plastic (permanent) deformation of the electrical contact 18a-c. By resisting plastic deformations of the electrical contacts 18a-c, the contact supports 36a-d also help ensure that plugs or prongs establish sufficient electrical continuity with the electrical contacts 18a-c and maintain appropriate retention of the plugs or prongs throughout the life of the unit. The contact supports 36a-d also serve to limit side loads that may be imparted to the circuit board substrate 16 due to insertion of a plug or prong into a given contact 18a-c, or due to side loads applied to a plug or prong that is already inserted into a contact. For example, if a plug is inserted into one set of contacts 18a-c and the plug accidentally bumped by a book, a computer, or another object moving laterally in front of the outer front face panel 22, a portion of those side loads may be borne by the front face panel 22 while another portion of those side loads may be borne by the inner front face portion 32, some of which may be imparted to the inner front face portion 32 due to engagement of the plug-engaged contacts 18a-c with the corresponding contact supports 36a-d.

Assembly of the electrical power or electronic data unit 10 is simplified by use of electrical contacts 18a-c that are soldered or otherwise mechanically and electrically coupled to the circuit board substrate 16 in a pre-assembly step. When multiple sets of high voltage AC electrical contacts 18a-c are provided as shown in the illustrated embodiment, it may be advantageous to provide separate line, neutral, and ground conductor paths 39a-c along the circuit board 16 (FIG. 10). Such conductor paths and contact mounting arrangements are more fully described in commonly-owned and co-pending U.S. patent application, Ser. No. 16/403, 922, filed May 6, 2019 (U.S. Pub. No. 2019/0341712), and commonly-owned and co-pending U.S. patent application, Ser. No. 16/917,076, filed Jun. 30, 2020, both of which are hereby incorporated herein by reference in their entireties.

In the illustrated embodiment, and as more fully disclosed in the above-referenced and incorporated U.S. Pub. No. 2019/0341712, each electrical contact 18a-c has a respective rear blade terminal 40a-c that extends through a respective slot opening in the circuit board substrate 16 and protrudes rearwardly therefrom, such as shown in FIGS. 5 and 11. The inner rear housing portion 30 defines at least three power input openings 42a-c (FIGS. 9 and 12) that are aligned with respective ones of the power-receiving rear blade terminals 40a-c of the electrical contacts 18a-c. As shown in FIG. 9, the power input openings 42a-c are not required to all be open at the same set of contacts, but instead some of the openings can be closed off (as in the closed-off openings 42a and 42b in the region designated XII in FIG. 9) and output terminals 20a-c can instead inserted through openings of different sets of contacts. Because electrical continuity can be established among all electrical contacts having the same polarity along the circuit board 16 via conductive paths 39a-b (FIG. 10) in the manner more fully described in U.S. Pub. No. 2019/0341712, establishing a power supply connection (via one of the output terminals 20a-c) to any one of a plurality of contacts 18a-c along the circuit board 16 will energize all contacts having the same polarity.

Bby leaving at least two of each opening 42a-c open for receiving connectors, it is also possible to install and "jumper" together multiple inner housings 14 and corresponding circuit boards 16 in series along a single outer housing 12 having sufficient length to accommodate a desired number of outlets. That is, with at least two line openings 42a, at least two neutral openings 42b, and at least two ground openings 42c, a set of jumper wires can be used to supply electrical power and ground connections to a second circuit board 16 of a second inner housing 14 by attaching the wires to a second set of openings 42a-c at the rear of the first inner housing 14. Other types of electrical and/or electronic data inserts that are compatible with outer housing 12 may also be accommodated and supplied with power and/or data in a similar manner, such as described in commonly-owned U.S. Pat. No. 8,444,432 and U.S. Pat. No. 8,480,429, which are both hereby incorporated herein by reference in their entireties. Low voltage outlets may be accommodated into a modified version of the inner rear housing portion 30, such as in the manner described in commonly-owned U.S. Pat. No. 9,312,673, which is hereby incorporated herein by reference in its entirety A power input cord (not shown) includes a line conductor terminating in the line output terminal 20a, a neutral conductor terminating in the neutral output terminal 20b, and a ground conductor terminating in the ground output terminal 20c, which are shown in FIG. 12. The output terminals 20a-c are configured for insertion through respective ones of the power input openings 42a-c for electrical connection to respective ones of the power receiving rear blade terminals 40a-c of the electrical contacts 18a-c. The power cord associated with the output terminals 20a-c enters the outer housing through a power cord opening 44 that is fitted with a strain relief grommet 46, such as shown in FIGS. 2-5. The power input cord is routed into the outer housing 12 via the power cord opening 44 and the strain relief grommet 46 so that a portion of the power input cord and portions of the output terminals 20a-c are positioned between the inner rear housing portion 30 and the main outer housing portion.

Optionally, the electrical power or electronic data unit 10 may be adapted to incorporate an AC-to-DC electrical power converter and a low voltage DC power receptacle that would be aligned with a correspondingly-shaped outer receptacle opening and a correspondingly-shaped inner receptacle opening. The AC-to-DC power converter received power from conductors in communication with a line contact 18a and a neutral contact 18b. To accommodate the extra space that may be required inside the inner housing 14 for the AC-to-DC electrical power converter, the inner rear housing portion 30 includes a first rear wall portion 48a that is spaced relatively closer to the inner front face portion 32 in the vicinity of the high voltage AC power contacts 18a-c, and a second rear wall portion 48b that is adjacent the first rear wall portion 48a and spaced relatively further from the inner front face portion 32 (FIG. 9). Because the first rear wall portion 48a is closer to the inner front face portion 32, and thus provides additional clearance from a rear wall of the main outer housing portion 26, the first rear wall portion 48a is a convenient region for power input openings 42a-c where electrical cord conductors and their output terminals 20a-c will be located. The AC-to-DC electrical power converter is positionable in the inner housing 14 in the vicinity of the second rear wall portion 48b, where additional interior space is provided. Referring to FIG. 5, an interior elongate channel 50 is formed along a sidewall 52 of the inner rear housing portion 30, which channel 50 can facilitate mounting a board-mounted DC receptacle and/or the AC-to-DC electrical power converter, such as in the manner more fully described in the above-referenced U.S. Pat. No. 9,312,673.

Inner housing 14, containing the electrical contacts 18a-c and circuit board 16, is readily installed at the main outer housing portion 26 by sliding the inner housing 14 into the main outer housing portion 26, typically after the electrical connections are established to the power cord with output terminals 20a-c. Referring to FIG. 5, an upper portion of the main outer housing portion 26 defines an upper pair of elongate channels 54a, 54b while a lower portion of the outer housing 26 defines a lower pair of elongate channels 56a, 56b spaced opposite the upper pair of elongate channels 54a, 54b. The forward elongate channels 54a, 56a support the inner front face portion 32 and the rearward elongate channels 54b, 56b support the inner rear housing portion 30. This is accomplished by slidably inserting respective upper tabs 58a and lower tabs 58b of the inner rear housing portion 30 into the rearward elongate channels 54b, 56b, and by sliding or otherwise pushing respective upper tabs 60a and lower tabs 60b of the inner front face portion 32 into the forward elongate channels 54a, 56a. In the illustrated embodiment, the upper and lower tabs 60a, 60b of the inner front face portion 32 are resilient tabs with sloped rear end portions that permit snap-fit engagement with the forward elongate channels 54a, 56a if desired. It will be appreciated that limited flexibility of the main outer housing portion 26 may also permit the upper and lower tabs 58a, 58b of the inner rear housing portion 30 to be snap-fit into the rearward elongate channels 54b, 56b, if desired.

The open sides and front end of the main outer housing portion 26 are enclosed by the two end caps 28 and the outer front face panel 22 to complete the assembly of the outer housing 12. End caps 28 include forward snap-fit elements 62 that are configured for engagement with respective snap-fit elements at side edges of the outer front face panel 22. The end caps 28 further include respective lateral rear projections 64 that are configured for insertion into a rearward interior portion of the main outer housing portion 26. The end caps are secured to the main outer housing portion 26 by the outer front face 22 and by engagement of the lateral rear projections 64 with retaining elements in the form of threaded fasteners 66 (FIG. 3) that extend forwardly through a rear panel of the main outer housing portion 26 and into respective threaded or threadable bores 68 in the rear projections 64 (FIG. 5). Optionally, the fasteners 66 may be hidden from view by placing each end cap 28 at each open end of the main outer housing portion 26 and inserting each fastener 66 into the main outer housing portion 26 to first engage the threaded or threadable bores 68 in the rear projections 64, and then driving the fasteners 66 into respective bores or a threadable slot 70 that is formed along an interior surface of the rear panel of the main outer housing portion 26. Snap-fit features may be substituted for the separate fasteners 66, if desired.

Accordingly, the electrical power or electronic data unit of the present invention provides a robust design that is resistant to damage caused by mishandling of plugs or prongs inserted into engagement with the electrical contacts, that limits the exposure of live electrical contacts to only small openings in an inner housing where connectors are intended to enter, and that is relatively simple to assemble with minimal use of separate fasteners. For example, multiple electrical and/or data outlets may be provided in a single internal unit, while eliminating butt splices, grounding plates, and other structures that are common to other power units. The electrical power or electronic data unit may provide users with access to high voltage AC electrical outlets and/or to low voltage DC electrical outlets, or to electronic data connectors.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power or electronic data unit comprising:
    an outer housing including an outer front face panel defining an outer receptacle opening;
    an inner housing configured for insertion into said outer housing, said inner housing having an inner rear housing portion and an inner front face portion defining an inner receptacle opening aligned with said outer receptacle opening;
    an electrical contact positioned inside said inner housing and aligned with and accessible through said inner receptacle opening and said outer receptacle opening; and
    a contact support extending rearwardly from a rear surface of said inner front face portion adjacent said inner receptacle opening;
    wherein said contact support is configured to limit movement of said electrical contact in the direction of said contact support during insertion of a plug or prong into engagement with said electrical contact.

2. The electrical power or electronic data unit of claim 1, wherein:
    said outer front face panel defines a plurality of said outer receptacle openings in spaced arrangement;
    said inner front face portion defines a plurality of said inner receptacle openings aligned with respective ones of said outer receptacle openings;
    said electrical contact comprises a plurality of electrical contacts in spaced arrangement and aligned with respective ones of said inner receptacle openings; and
    said contact support comprises a plurality of contact supports arranged with at least one of said contact supports at each of two opposite sides of said inner receptacle openings.

3. The electrical power or electronic data unit of claim 2, wherein at least two of said electrical contacts comprise high voltage AC power contacts.

4. The electrical power or electronic data unit of claim 1, further comprising a circuit board substrate positioned inside said inner housing, wherein said electrical contact is mounted at said circuit board substrate.

5. The electrical power or electronic data unit of claim 4, wherein at least four of said electrical contacts comprise high voltage AC power contacts cooperating to form a first high voltage AC receptacle including a first line contact and a first neutral contact, and a second high voltage AC receptacle including a second line contact and a second neutral contact, and wherein said first and second line contacts are in electrical communication with one another via a line conductor path formed along said circuit board substrate and said first and second neutral contacts are in electrical communication with one another via a neutral conductor path formed along said circuit board substrate and spaced from said line conductor path.

6. The electrical power or electronic data unit of claim 5, wherein said first line contact and said first neutral contact comprise respective power receiving terminals protruding rearwardly from said circuit board substrate, and wherein said inner rear housing portion defines a pair of power input openings aligned with respective ones of said power receiving terminals.

7. The electrical power or electronic data unit of claim 6, further comprising a line output terminal for coupling to a line conductor of a power input cord, and a neutral output terminal for coupling to a neutral conductor of the power input cord, wherein said line and neutral output terminals are configured for insertion through respective ones of said power input openings for electrical connection to respective ones of said power receiving terminals of said first line contact and said first neutral contact.

8. The electrical power or electronic data unit of claim 7, wherein said outer housing defines a power cord opening fitted with a strain relief grommet, wherein said power input cord is routed into said outer housing via said power cord opening and said strain relief grommet so that a portion of the power input cord and portions of said line and neutral output terminals are positionable between said inner rear housing portion and said outer housing.

9. The electrical power or electronic data unit of claim 2, further comprising an AC-to-DC electrical power converter and a low voltage DC power receptacle that is aligned with one of said of said outer receptacle openings and one of said inner receptacle openings, wherein at least two of said electrical contacts comprise high voltage AC power contacts cooperating to form a high voltage AC receptacle including a line contact and a neutral contact, and wherein said power converter receives high voltage AC electrical power from respective electrical conductors in communication with said first and second line contacts and supplies low voltage DC electrical power to said low voltage DC power receptacle.

10. The electrical power or electronic data unit of claim 9, wherein said inner rear housing portion comprises a first rear wall portion spaced relatively closer to said inner front face portion at said high voltage AC power contacts and a second rear wall portion adjacent said first rear wall portion and spaced relatively further from said inner front face portion at said AC-to-DC electrical power converter.

11. The electrical power or electronic data unit of claim 10, wherein said first rear wall portion of said inner rear housing portion defines at least one power input opening configured to permit electrical connection of a power cord to said high voltage AC power contacts.

12. The electrical power or electronic data unit of claim 2, further comprising a continuous wall surrounding each of said inner receptacle openings and projecting rearwardly from said rear surface of said inner front face portion.

13. The electrical power or electronic data unit of claim 12, wherein said contact supports are positioned immediately outboard of said continuous walls.

14. The electrical power or electronic data unit of claim 1, wherein an upper portion of said outer housing defines an upper pair of elongate channels and a lower portion of said outer housing defines a lower pair of elongate channels spaced opposite said upper pair of elongate channels, and wherein said upper and lower pairs of elongate channels are configured to support said outer front face panel and said inner front face portion.

15. The electrical power or electronic data unit of claim 14, wherein said outer front face panel comprises an upper projection configured to engage a first of said upper pair of elongate channels and a lower projection configured to engage a first of said lower pair of elongate channels, and wherein said inner front face portion comprises an upper projection configured to engage a second of said upper pair of elongate channels and a lower projection configured to engage a second of said lower pair of elongate channels.

16. The electrical power or electronic data unit of claim 1, further comprising a pair of end caps secured at open opposite ends of said outer housing.

17. The electrical power or electronic data unit of claim 15, wherein said end caps comprise forward snap-fit elements configured for engagement with respective snap-fit elements of said outer front face, and said end caps comprise respective lateral rear projections configured for insertion into a rearward interior portion of said outer housing, wherein said end caps are secured to said outer housing by said outer front face and engagement of said lateral rear protections by retaining elements at said outer housing.

18. An electrical power or electronic data unit comprising:
an outer housing including an outer front face panel defining outer receptacle openings;
an inner housing configured for insertion into said outer housing, said inner housing having an inner rear housing portion and an inner front face portion defining inner receptacle openings aligned with said outer receptacle openings;
a circuit board substrate positioned inside said inner housing; and
a line contact and a neutral contact mounted at said circuit board substrate and aligned with and accessible through respective ones of said inner receptacle openings and said outer receptacle openings;
wherein said line contact and said neutral contact comprise respective power receiving terminals protruding rearwardly from said circuit board substrate;
wherein said inner rear housing portion defines a pair of power input openings aligned with respective ones of said power receiving terminals; and
wherein respective line and neutral output terminals are insertable through respective ones of said power input openings for electrical connection to respective ones of said power receiving terminals.

19. The electrical power or electronic data unit of claim 18, further comprising a contact support extending rearwardly from a rear surface of said inner front face portion adjacent each of said inner receptacle openings, wherein said contact supports are configured to limit movement of said electrical contact in the direction of said contact support during insertion of a plug or prong into engagement with respective ones of said line contact and said neutral contact.

20. The electrical power or electronic data unit of claim 19, further comprising a continuous wall surrounding each of said inner receptacle openings and projecting rearwardly from said rear surface of said inner front face portion, wherein said contact supports are positioned immediately outboard of said continuous walls.

\* \* \* \* \*